United States Patent
Slater

(10) Patent No.: US 7,624,532 B2
(45) Date of Patent: Dec. 1, 2009

(54) GROW-A-HEAD

(76) Inventor: Randy Slater, 300 N. Monterey Rd., Palm Springs, CA (US) 92262

(*) Notice: Subject to any disclaimer, the term of this patent is extended or adjusted under 35 U.S.C. 154(b) by 303 days.

(21) Appl. No.: 11/193,809

(22) Filed: Jul. 28, 2005

(65) Prior Publication Data

US 2007/0022661 A1 Feb. 1, 2007

(51) Int. Cl.
*A01G 9/10* (2006.01)
(52) U.S. Cl. .................. 47/1.01 R; 47/61; 446/372
(58) Field of Classification Search .............. 47/65.8, 47/65.7, 61, 1.01 R; 29/248; D11/143, 158; 229/116.1, 116.3; 428/16; 434/433; 446/72, 446/268, 372, 385
See application file for complete search history.

(56) References Cited

U.S. PATENT DOCUMENTS

| | | | | | |
|---|---|---|---|---|---|
| 1,342,786 | A | * | 6/1920 | White | 47/81 |
| 2,013,114 | A | * | 9/1935 | Smith | 446/385 |
| 2,233,032 | A | * | 2/1941 | Robinson | 47/65.7 |
| 2,478,480 | A | * | 8/1949 | Greer | 156/61 |
| 2,552,265 | A | * | 5/1951 | Edwards | 63/20 |
| 4,163,343 | A | * | 8/1979 | Schoenfield | 47/65.8 |
| 4,407,092 | A | * | 10/1983 | Ware | 47/64 |
| 4,434,577 | A | * | 3/1984 | Holtkamp | 47/81 |
| 5,194,030 | A | | 3/1993 | LeBoeuf et al. | |
| 5,239,774 | A | | 8/1993 | Rickabaugh | |
| 5,352,253 | A | * | 10/1994 | Gritching | 47/66.7 |
| 5,491,929 | A | * | 2/1996 | Peacock et al. | 47/84 |
| 5,549,500 | A | * | 8/1996 | Manoah | 446/385 |
| 5,860,249 | A | * | 1/1999 | Holtkamp, Jr. | 47/81 |
| 6,189,260 | B1 | * | 2/2001 | Kusey et al. | 47/9 |
| 6,298,599 | B1 | | 10/2001 | Weiner | |
| 6,374,541 | B1 | * | 4/2002 | Ho | 47/79 |
| 2005/0076565 | A1 | * | 4/2005 | Terrell | 47/65.8 |
| 2007/0022661 | A1 | * | 2/2007 | Slater | 47/81 |

* cited by examiner

*Primary Examiner*—Francis T Palo
(74) *Attorney, Agent, or Firm*—Kirk A. Buhler; Buhlar & Associates

(57) ABSTRACT

A figurine shaped from coir base material compressed with a combination of fertilizer, paper and sawdust. The figurine includes a self-watering wick that allows water to be drawn from a reservoir to provide continuous water to the coir material. The figurine is further covered with grass seeds and nylon net to retain the seeds on the coir figurine. When water is added to the figurine, the seeds sprout grass that resembles hair. The grass can further be trimmed or grown to a desired length. Figurines or shapes can be human, animal or other shapes.

16 Claims, 4 Drawing Sheets

GROW-A-HEAD

FIELD OF THE INVENTION

This invention relates to a self-watering figurine. More particularly, the present invention relates to a figurine shaped from the compressed part of coconut husk, known as coir. The coir is compressed with a wick that allows water to be drawn from a reservoir to provide continuous water to the coir material, thus keeping seeds on top moist enough to propagate and grow. The figurine includes plant seeds that simulate hair growing on the figurine.

BACKGROUND OF THE INVENTION

Several products are available that allow for grass to grow as simulated hair on a figurine. Several patents have also been issued to allow for the growing of grass or other plant types on or from a figurine. However, these products require frequent manual watering to keep the plant life alive.

Figurines of animals or heads have been sold under the trademark of CHIA PET sold by Joseph Enterprises, Inc. These figurines consist of a hollow clay body in the shape of an animal or other shape. The clay body is filled with water and a paste consisting of a bonding agent and seeds that is spread over some or all of the figurine that later grows to appear as hair on the clay body. While this product provides the cosmetic appearance of hair being grown on a figurine, the product base is made from a ceramic material that is not self-watering. When the reservoir is filled with water, the water leeches out through the ceramic head to keep the seeds moist. The water level can not be visually determined, and a user must spread the seeds over the top of the product.

Weiner U.S. Pat. No. 6,298,599 discloses a sculptured head and torso where the head can receive a plant with leaves where the leaves provide the appearance of hair. The plant(s) are placed within the head, and any excess water applied can drip through the head sculpture and be collected within the base of the sculpture for disposal. While this product provides the cosmetic appearance of hair being grown on a figurine, the product is made from multiple pieces of ceramic material that is not self-watering. Excess water must be removed and discarded. A potted plant or an unpotted plant can be placed into the top of the sculptured head, but there is no provision for the ceramic head to support seeds or other plant life from growing on or within the head. The water level also can not be visually determined from viewing the outside of the sculptured head.

Manoah U.S. Pat. No. 5,549,500 discloses an animal figurine made from saw dust placed within a netting material. Seeds are placed within the bottom or scalp portion of the netting material and then saw dust is added into the netting. The entire assembly is then watered to allow the seeds to grow. This product provides a ball of saw dust that the seeds grow from. The sawdust ball provides minimal shape, and any features must be added to the sawdust ball as a secondary operation. Excessive water can wash past the head or be collected in a dish where the ball is placed. While the dish provides for a collection of water or water to be provided to the sawdust ball, the amount of water available is limited to the water stored in a dish and cannot be drawn from a reservoir.

What is needed is a simple preformed figurine shape that provides self-watering where the water can be drawn through a wick from a reservoir, and the amount of water in the reservoir can be easily seen. The proposed invention satisfies these needs by providing a coir-based figurine with retained plant seeds and a watering wick.

BRIEF SUMMARY OF THE INVENTION

It is an object of the proposed invention to provide a figurine consisting basically of a coir based material. The coir material is pre-formed into the shape of a character such as the head of a person animal or other shape. The animal shapes may include a dog, cat, pig, or other known animal, cartoon character. While the head of person may include a generic male or female, or may include the shape of a celebrity.

Another object of the invention provides the figurine with a self-watering wick made of cloth, fiber material, woven or twisted material that can draw water from a reservoir.

Another object of the invention is to provide the coir based material with other growing media that may include fertilizer, paper, sawdust or other materials that may provide both a filler for the coir, as well as additional nutrition for the plant life. The fertilizer may be coated to provide a time release function that allows the fertilizer to dissipate over an extended period of time to provide nutrients to the simulated hair.

Another object of the invention is to provide a net covering of the figurine to allow retention of the plant material so the plant material remains in position while the seeds germinate.

Another object of the invention is to provide various types of plant material such as various types of grass seeds, moss, or other low growing vegetation with or without flowering sprouts.

Another object of the invention is to provide a visual reservoir that allows inspection of the amount of water that is available for watering of the figurine.

Another object of the invention is to provide the shape with head or face adornment features such as a nose, ears, smile, earrings and or nose rings. Some of these features may alternately be included in the packaging but not pre-attached to the shape. Some of these features will be pre-affixed to the head but may also be available as separate or kit with additional features that can be added such as sun glasses, bow ties, and even eyes and nose, etc.

Another object of the invention is to provide the figurine in a complete head package including a planted figurine head with seeds, wick installed and reservoir cup so the only component needed is water for the plant material to grow and simulate hair on the figurine.

Still another object of the invention is to provide plants or seeds that grow on the top of the figure such that the plants or seeds provides the appearance of hair on the figurine. The simulated hair can be trimmed or styled based upon user or owner preference.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
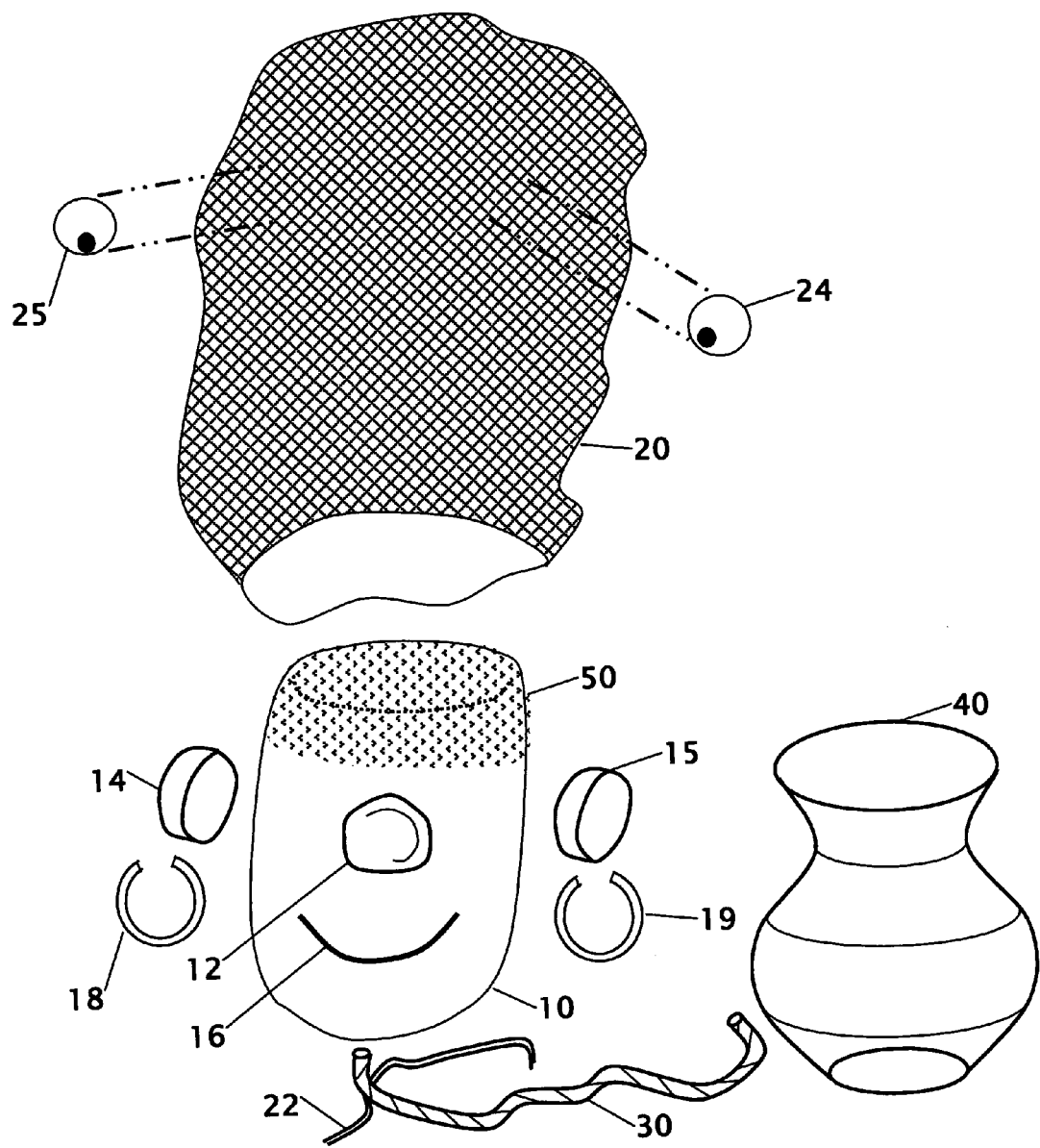
FIG. 1 is an isometric exploded view showing the components of the coir figurine.

Referring to FIG. 1 there is shown an isometric exploded view showing the components of the coir figurine. The major component of the figurine is the coir head 10. Coir is biodegradable organic fibers made from the fibrous material that forms part of the soft mass that surrounds a coconut. This fibrous material is ideal for this application due to its hygroscopic properties for retaining and wicking moisture. The coir is chopped and or shredded and then formed into the desired shape that makes-up the figurine. The shape of the figurine can vary from resembling a human, animal, cartoon, or celebrity shape. In the preferred embodiment, the coir figurine is about 3 inches tall and about 1½ inches in diameter, but other dimensions or shapes are contemplated. As an example of alternative shapes, the shape may be a 2-inch tall oval shape about 4 inches across. While the base material of the figurine is made from is coconut husk, other materials can be added to fill, supplement and or bond the coconut coir. Filling materials may include but not be limited to fertilizer, paper, and sawdust. In the preferred embodiment, time released fertilizer is included in the coir shape. The fertilizer dissipates over an extended period of time to provide nutrients so the simulated hair will grow. A bonding material may be utilized to hold the coir in shape during the fabrication and or seed sprouting phase. The bonding agents may include but not be limited to polymers, glues, waxes or other similar additives that may help to keep the coir in the desired shape. Once to coir shape has been formed, additional features may be added to the figurine. Other materials are contemplated that can be used to form the head shape. Some of these materials include but are not limited to synthetic materials such as chopped plastics or recycled bottles and bags. Other natural materials such as peat moss or bark can also be used.

Shapes such as a nose 12, ears 14, 15 and a smile 16 may be added to the figurine to add additional character to the figurine. It is further contemplated that one or more head or face adornment items including but not limited to hair bands, ribbons, ears or nose rings can be added to the coir shape. Some features such as earrings 18, 19 can be added to the figurine after purchase. The shape of the nose 12 in this figure is round in shape, but in the case of a dog, the nose or snout may be elongated. The shape of the ears 14, 15 also are shown as round, but in the case of a cat figurine the ears may be pointed, or in the configuration of a dog, the ears may hang down on the sides of the head. The smile 16, can be formed into or out of the coir head. The mouth, smile, or other feature may be sewn on to the head or it may be simply drawn onto the coir head when it is manufactured or by the buyer of the figurine. Seeds 50 are placed, bonded or otherwise retained on the top of the heads. The seeds can be a variety of one type of seeds or a blending of seeds. In the preferred embodiment, the seeds are a grass seed, but other types of seeds such as flower or vegetable seeds can be used that may create a different effect of hair. Grass seeds such as bahaigrass, bentgrass, bermuds, bluegrass, buffalo, carpetgrass, centipede, fescue, ryegrass, St Augustine and zoysia can be used, but in the preferred embodiment the seeds are ryegrass because they are tolerant to variations in watering and provide a more hair like appearance.

A watering wick 30 is to be placed within the coir shape to provide a continuous feeding of water from a reservoir to the coir shape. The watering wick can be made from a variety of methods including but not limited to woven, braided, stranded, twisted, rolled, knitted, spun or gathered. The watering wick may also be fabricated from a number of materials including but not limited to cotton, nylon, felt, polyester and silk. In the preferred embodiment, the wick is made from a twisted cotton fiber.

A net, screen, or mesh 20 is placed over or placed around the coir and seed assembly to retain the seed upon the top of the figurine. The netting can be made from a variety of materials that provide the function of retaining the seeds on top of the head, and still allowing seeds to sprout through the netting. Acceptable materials that provide this function may include but not be limited to nylon, silk, metal, cloth and cotton. After the netting is drawn over or around the coir shape, it may be gathered or collected and tied with one or more piece(s) of string, yarn or wire 22 to maintain the seeds upon the coir shape while the seeds sprout.

After the mesh is placed over the coir shape additional features can be added or drawn onto the figurine. Items that can be added may include but not be limited to eyes 24, 25, mouth 16, ear rings 18, 19, ears 14, 15, tail, snout, mustache, eyebrows, nose ring and facial hair. This entire assembly can then be placed into a glass or cup 40 that is used as a reservoir to provide water from the bottom of the cup through the wick and into the figurine.

Figure 2:
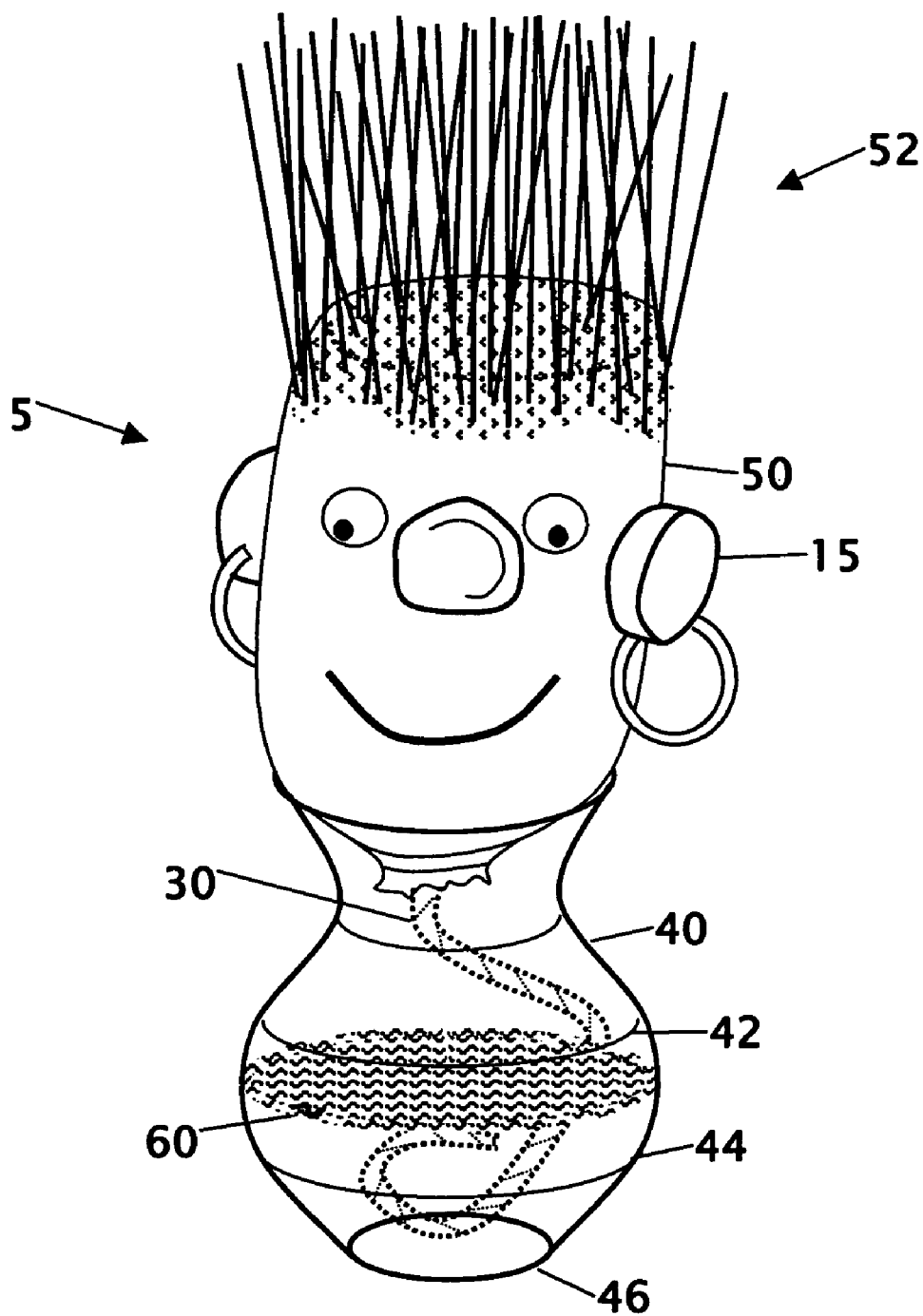
FIG. 2 is an isometric view of the coir figurine with plant material shown growing out of the top of the figurine.

FIG. 2 is an isometric view of the coir figurine with plant material shown growing out of the top of the figurine. The figurine 5 is shown placed in the reservoir 40 with the wick 30 shown in water 60. The head of the figurine 50 is shown with ear 15 located on the side of the figurine, and hair 52 growing out of the top of the figurine. The glass in this figure provides a good visual representation of the reservoir with water in the reservoir. In the preferred embodiment, the reservoir is fabricated from a plastic material. Acceptable plastic material may include but not be limited to PVC, ABS, acrylic and polycarbonate. Glass, crystal or other materials may be used that will accomplish the same result as holding water. As shown in this figure, the reservoir is transparent clear or semi-transparent. While a clear reservoir is preferred, the reservoir can be frosted, colored, opaque or translucent. A user may optionally discard the provided reservoir and utilize their own cup, pot or other container to grow the head. The amount of water that can be stored within the reservoir can also vary. In the preferred embodiment, the reservoir contains a minimum 44 and maximum 42 water level markings where the ideal water level is about 2 ounces of fluid or water. A mark for the preferred or ideal water level may be optionally included or used instead of the minimum and maximum water level markings. Markings may also or optionally be provided to indicate the amount of water within the reservoir in ounces. This figure shows a flat base 46 of the reservoir that helps keep the reservoir in an upright orientation. Depending upon the configuration of the reservoir, the base may be optional fabricated from a different material than the reservoir.

Figure 3:
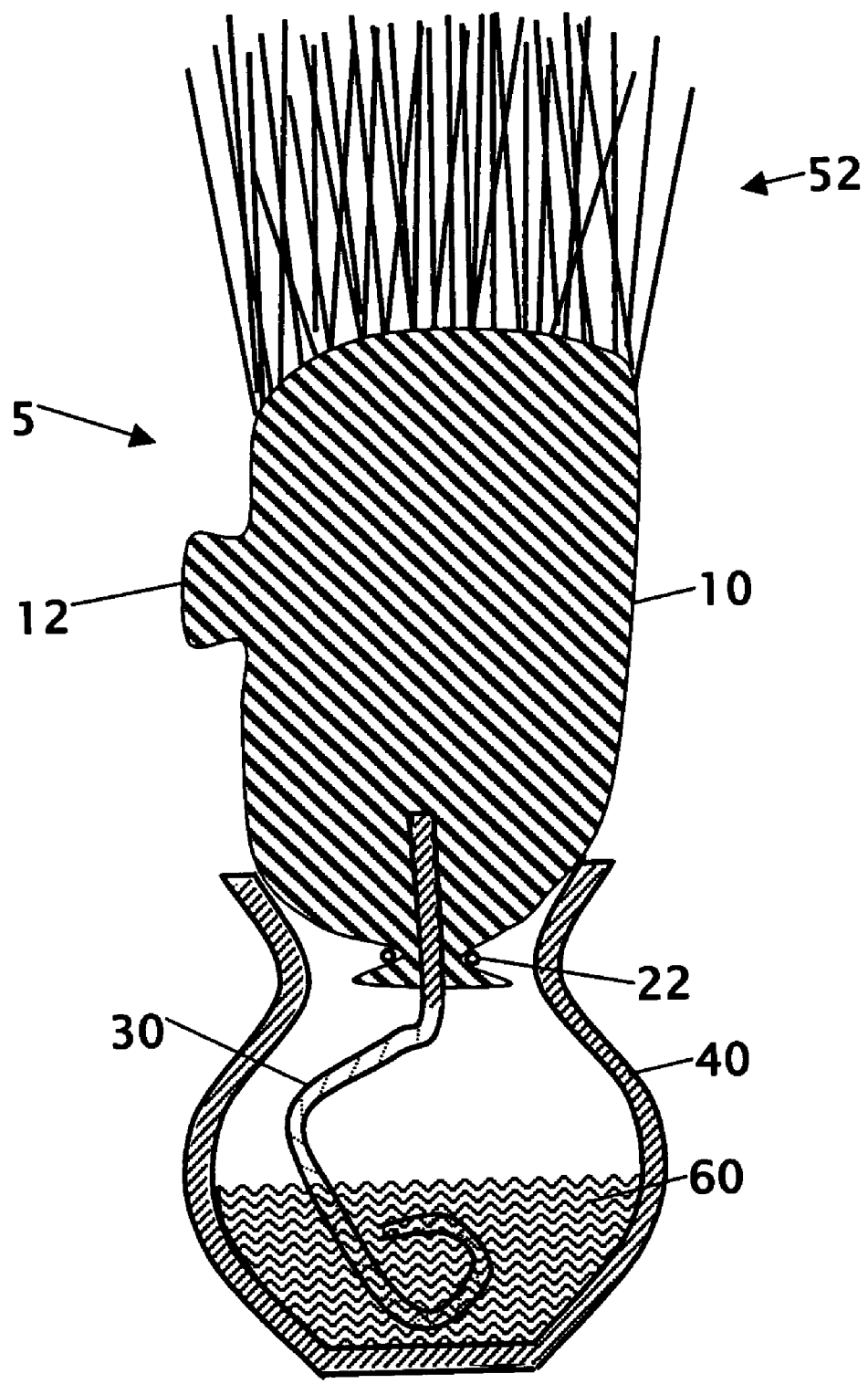
FIG. 3 is a cross sectional view of the coir figurine showing the various components from FIG. 2 shown in greater detail.

FIG. 3 is a cross sectional view of the coir figurine showing the various components from FIG. 2, shown in greater detail. In this cross sectional view the coir figurine 5 is cut through the thick portion of the head 10 and nose 12. The grass hair 52 is shown extending up from the top of the figurine. The tape, string, wire or ribbon 22 that secures the coir figurine and the watering wick 30 is partially shown in this figure. The plastic reservoir 40 is shown with water 60 located inside the reservoir where the wick 30 can draw water from the reservoir into the coir figurine.

Figure 4:
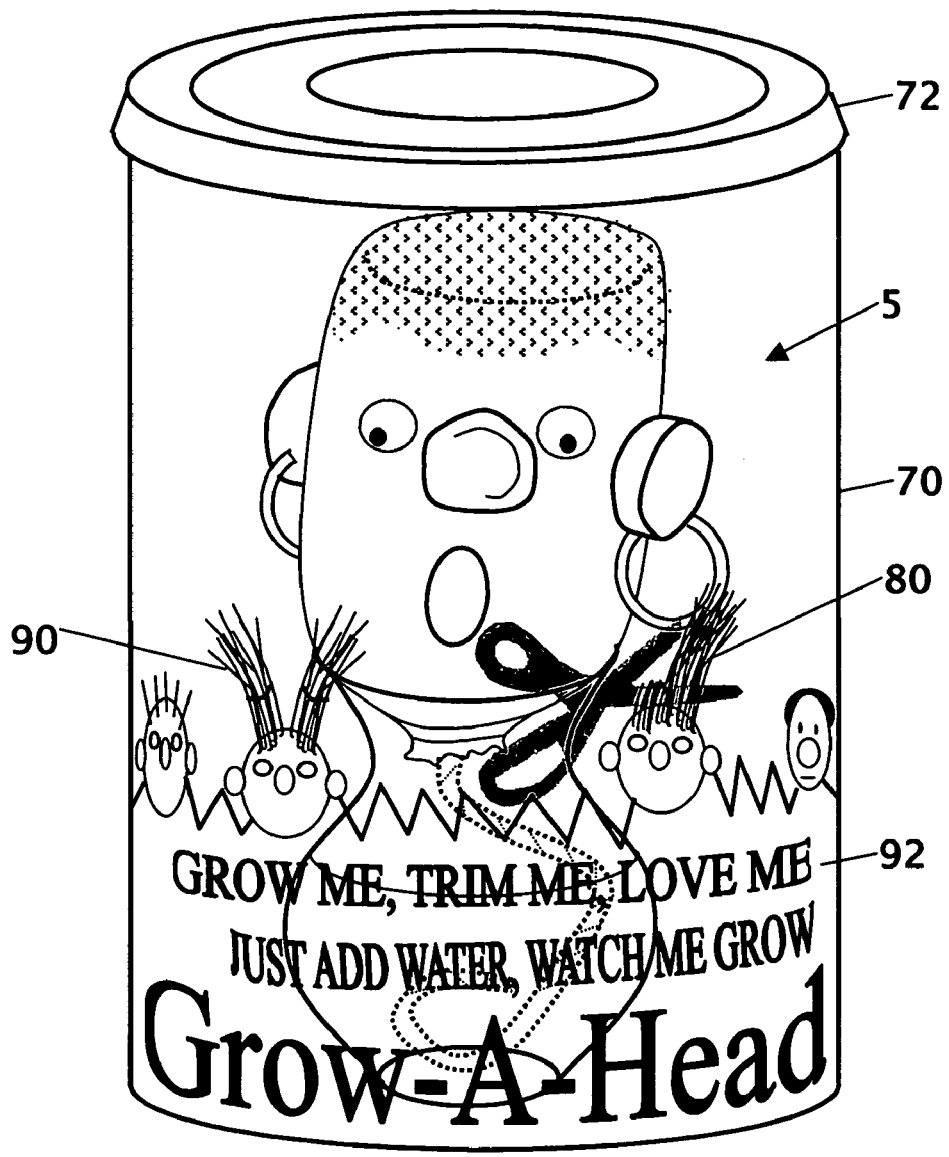
FIG. 4 shows one contemplated packaging method for the coir figurine.

FIG. 4 shows one contemplated packaging method for the coir figurine. While many packaging methods can be used to package the product, the preferred embodiment of packaging the product is shown in this figure. This method of packaging is ideal because the components are readily available, cost effective, and provide a semi-sealed environment that is minimally affected by humidity and moisture changes. An alternative vacuum packaging method is contemplated because the vacuum packaging removes moisture from the packaging and helps to retard any growth that may occur from the seeds collecting moisture from the air. The vacuum packaging also allows for other retail store display options, such as hanging the product for distribution or sale. In this figure, the coir figurine 5 is shown assembled and placed into the clear glass vase reservoir. This entire assembly is then placed within a clear plastic cylindrical container 70 with a removable lid 72. The instructions 80 for growing the figurine are also shown within or on the cup 70, but may optionally be placed or taped to the outside of the cup or lid. The instructions may also be optionally printed on the outside of the cup or lid. Additional printing 92 can be placed on the cup to indicate the type of product or what it does. Other printing 90 can show other figurines that are available to encourage purchasing the entire group.

Thus, specific embodiments and applications for a coir-based figurine have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A coir self watering figurine comprising:
   a coir blank in the shape of a head,
   a watering wick integrated into the coir head shape, and
   a reservoir to hold water that the watering wick can be placed into the water to draw water from below a bottom of the coir head shape up and into the coir head shape, and
   plant seeds retained under a netting secured around the coir head shape wherein said netting is secured where said wick exits said coir head shape with string, wire or yarn to retain said seed, coir, netting and wick as a single unit such that when said seed is grown, said seed appears to simulate grass hair.

2. The coir based figurine from claim 1 wherein the coir based shape further resembles a cartoon character shape.

3. The coir figurine from claim 1 wherein the coir figurine comprises coir, combined with one or more materials in a group consisting of fertilizer, paper, peat and sawdust.

4. The coir figurine from claim 1 wherein the figurine also includes a fertilizer integrated within the coir figurine.

5. The coir figurine from claim 1 wherein the watering wick is twisted.

6. The coir figurine from claim 1 wherein the watering wick is made from cotton.

7. The coir figurine from claim 1 wherein the reservoir can contain one or more ounces of fluid.

8. The coir figurine from claim 1 wherein the reservoir can contain one or less ounces of fluid.

9. The coir figurine from claim 1 wherein the reservoir is transparent or translucent.

10. The coir figurine from claim 1 wherein the reservoir is not transparent or translucent.

11. The coir figurine from claim 1 wherein the reservoir is made from plastic.

12. The coir figurine from claim 1 wherein the reservoir may optionally include markings to identify one or more of the following items, ounces, minimum, maximum and ideal water level.

13. The coir figurine from claim 1 wherein the netting is nylon material.

14. The coir figurine from claim 1 wherein the seeds are grass seeds.

15. The coir figurine from claim 1 wherein the grass seeds are ryegrass seeds.

16. The coir figurine from claim 1 wherein the figurine may further include one or more of items selected from the group consisting of ear rings, tail, snout, mustache, eyebrows, hair band, ribbon, hair net, nose ring, facial hair or other facial or head or body adornments that are user installed or removed from said coir figurine.

* * * * *